United States Patent [19]

North

[11] Patent Number: 5,439,634
[45] Date of Patent: Aug. 8, 1995

[54] METHOD AND DEVICE FOR SEPARATING RUNNERS/SPRUES FROM PARTS AS THEY ARE EJECTED FROM A MOLD

[75] Inventor: Robert R. North, Shreveport, La.

[73] Assignee: AT&T Corp., Murray Hill, N.J.

[21] Appl. No.: 163,962

[22] Filed: Dec. 8, 1993

[51] Int. Cl.⁶ .............................................. B29C 37/02
[52] U.S. Cl. .................................. 264/334; 425/215; 425/DIG. 51; 425/554; 425/436 R; 264/161
[58] Field of Search ............... 425/215, 216, DIG. 51, 425/554, 553, 556, 292, 436 R; 264/161, 163, 334

[56] References Cited

U.S. PATENT DOCUMENTS

| | | | |
|---|---|---|---|
| 2,995,775 | 8/1961 | Schnitzius et al. | 425/DIG. 51 |
| 3,805,875 | 4/1974 | Daugherty et al. | 425/556 |
| 3,986,811 | 10/1976 | Gunnels, Jr. | 425/556 |
| 4,295,815 | 10/1981 | Eltvedt | 425/556 |
| 4,589,840 | 5/1986 | Schad | 264/334 |
| 4,946,357 | 8/1990 | Harrison | 425/556 |

FOREIGN PATENT DOCUMENTS 2301375 2/1975 France .................................. 425/215
60-247525 12/1985 Japan .................................... 425/556

*Primary Examiner*—Jay H. Woo
*Assistant Examiner*—Robert B. Davis

[57] ABSTRACT

A method and apparatus for separating an injection molded product from a sprue/runner formed with the injection molded product in injection molds includes a product receiver underlying the injection molds for receiving the product after the molds have been opened and a sprue/runner receiver underlying the injection molds for receiving the sprue/runners after the molds have been opened. The product receiver and the sprue/runner receiver are positioned relative to the molds and relative to each other such that the product falls onto the product receiver while being precluded from falling into the sprue/runner receiver and the sprue/runners fall into the sprue/runner receiver while being precluded from falling onto the product receiver.

11 Claims, 4 Drawing Sheets

METHOD AND DEVICE FOR SEPARATING RUNNERS/SPRUES FROM PARTS AS THEY ARE EJECTED FROM A MOLD

BACKGROUND OF THE INVENTION

The method and device of the present invention relate to separating one group of items from another efficiently and inexpensively. Specifically, the present invention relates to a method and device for separating a sprue and runner combination from the desired products following injection molding.

During the process of injection molding, a product or products and a runner/sprue combination is obtained. The sprue is the material formed as a result of injecting material through a channel into a mold during the injection molding process. This channel branches off into a runner or runners which are channels connected to the area of the mold where the product or products are molded. Upon completion of the injection molding process the sprue and runner channels are filled with material molded to the shape of the sprue and runner. This molded material is referred to as the sprue/runner or sprue and runner combination. The sprue/runner can be recycled by remelting it and using it in another molding operation. Following the process of injection molding, it is necessary to separate the sprue/runner from the desired product.

Conventional methods of separating the sprue/runner from the products include employing a worker to manually separate them out of a common container into which they have fallen following their release from the mold. As an alternative, robots have been used to separate the sprue/runner from the product. These robots require computer programming and are costly. The principle drawbacks of these prior art arrangements are that they are both expensive and inefficient.

SUMMARY OF THE INVENTION

An objective of the present invention is to inexpensively and efficiently separate a sprue/runner from a product and to overcome the disadvantages of the known prior art.

The present invention realizes these objectives by a method and apparatus for inexpensively and efficiently separating the sprue/runner from the product.

The method of the present invention acts to separate the sprue/runner from the product. It includes catching the sprue/runner in a first device and catching the product in a second device to separate the sprue/runner from the product.

The apparatus of the present invention separates the sprue/runner from the product by a first device for catching the sprue/runner and a second device for catching the product.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
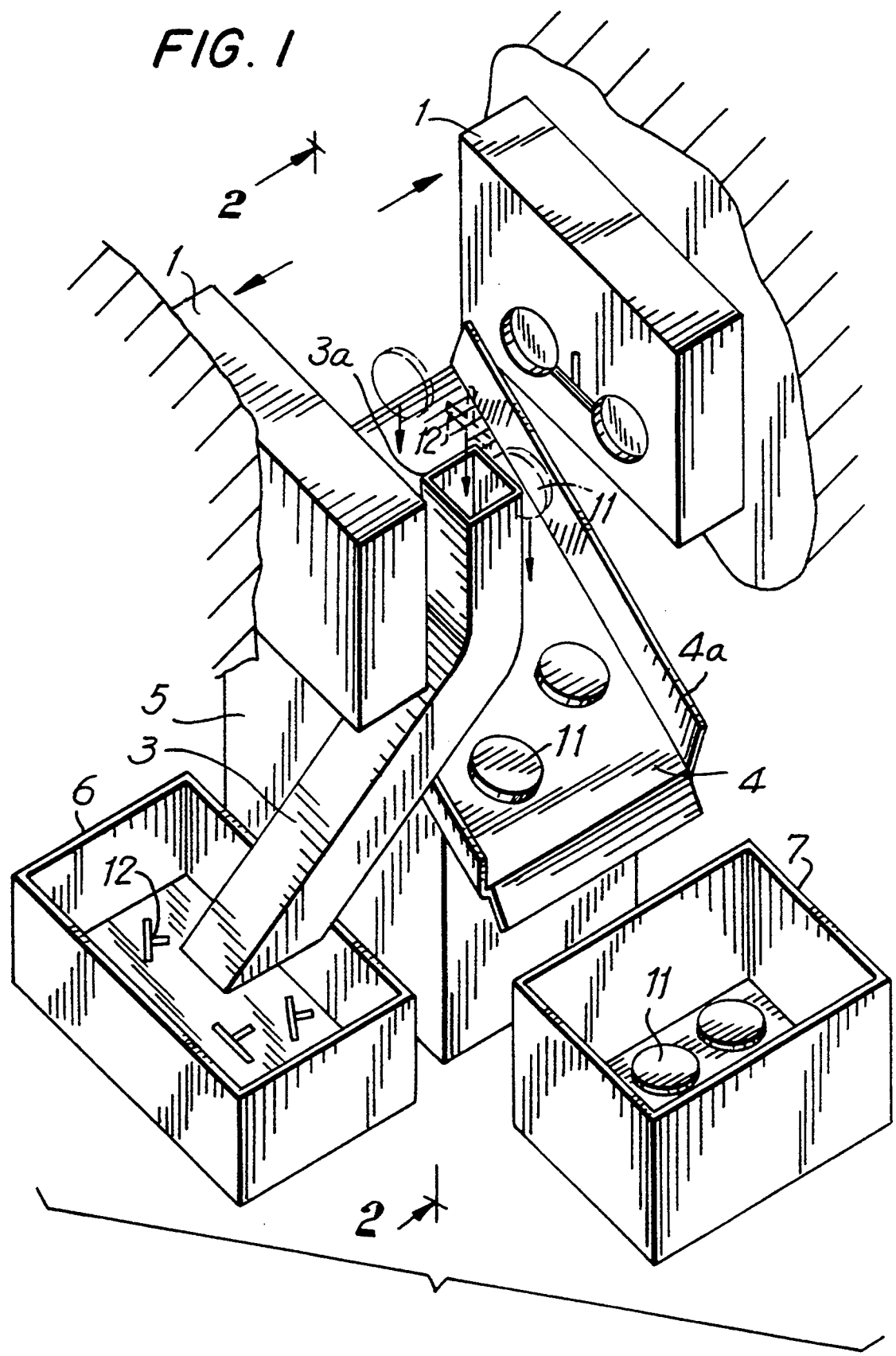
FIG. 1 is a perspective view of a first embodiment of the apparatus of the invention.
Figure 2:
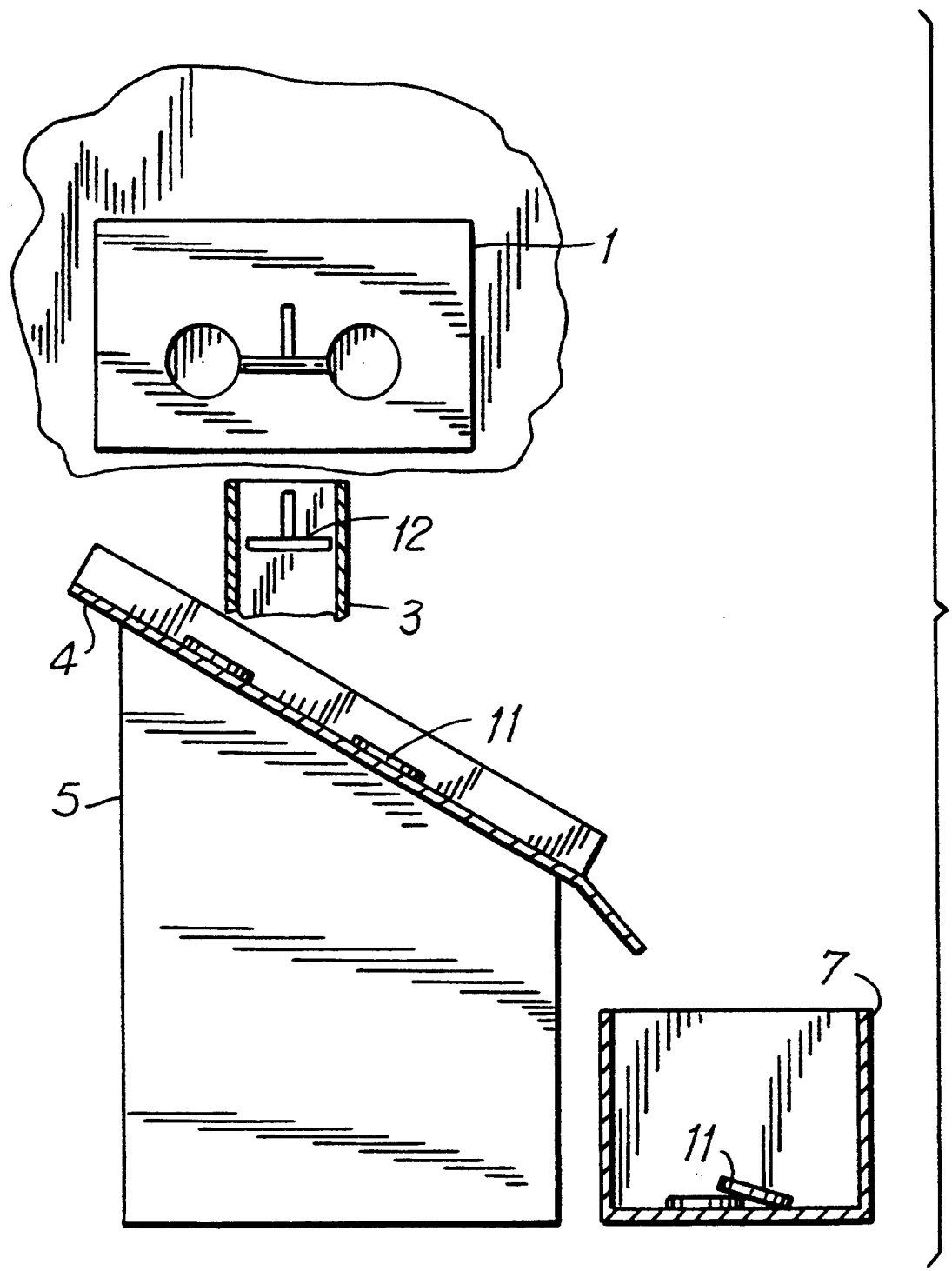
FIG. 2 is a sectional view of the first embodiment taken along line "2—2" of FIG. 1.

FIG. 1 shows an injection molding machine having molds 1,1. Located under the molds 1,1 are a tube 3 and a chute 4 which can be fashioned as a slide with or without side barriers. The tube 3 is shown fully enclosed with four sides, and placed under the molds 1,1 where the runner/sprue 12 fall out following the opening of the molds 1,1 used in the injection molding process. Similarly, the chute 4, which is shown open on the top with side barriers 4a, is placed under the molds at the point where the product 11 falls out following the opening of the molds at the end of the injection molding process. The chute 4 is shown supported by a stand 5. The tube 3 and chute 4 can empty into containers 6 and 7, respectively. It is possible to include one or more tubes or chutes depending upon the number of sprue/runner combinations 12 and products 11 produced.

The tube 3 has a rectangular inlet opening 3a which is only large enough to allow the sprue/runner to fall into the inlet opening 3a while allowing the product to fall onto either side onto the sloped surface of the chute 4. The inlet opening 3a is properly placed to underlie the sprue/runner to receive the sprue/runner while precluding entry of the product into the inlet opening 3a.

The tube 3 and the chute 4 incline at an optimal angle for catching the sprue/runner 12 and product 11, respectively, and carrying them away. The angle can be, for example, 45°. Additionally, the tube 3 and the chute 4 are preferably located, with respect to one another, such as to carry the sprue/runner 12 away from the product 11. For example, the tube 3 and the chute 4 can be placed at right angles to each other as shown in FIG. 1. The distance between the point of the molds 1,1 where the sprue/runner falls out and the inlet of the tube 3 can be, for example, 6 inches.

Figure 3:
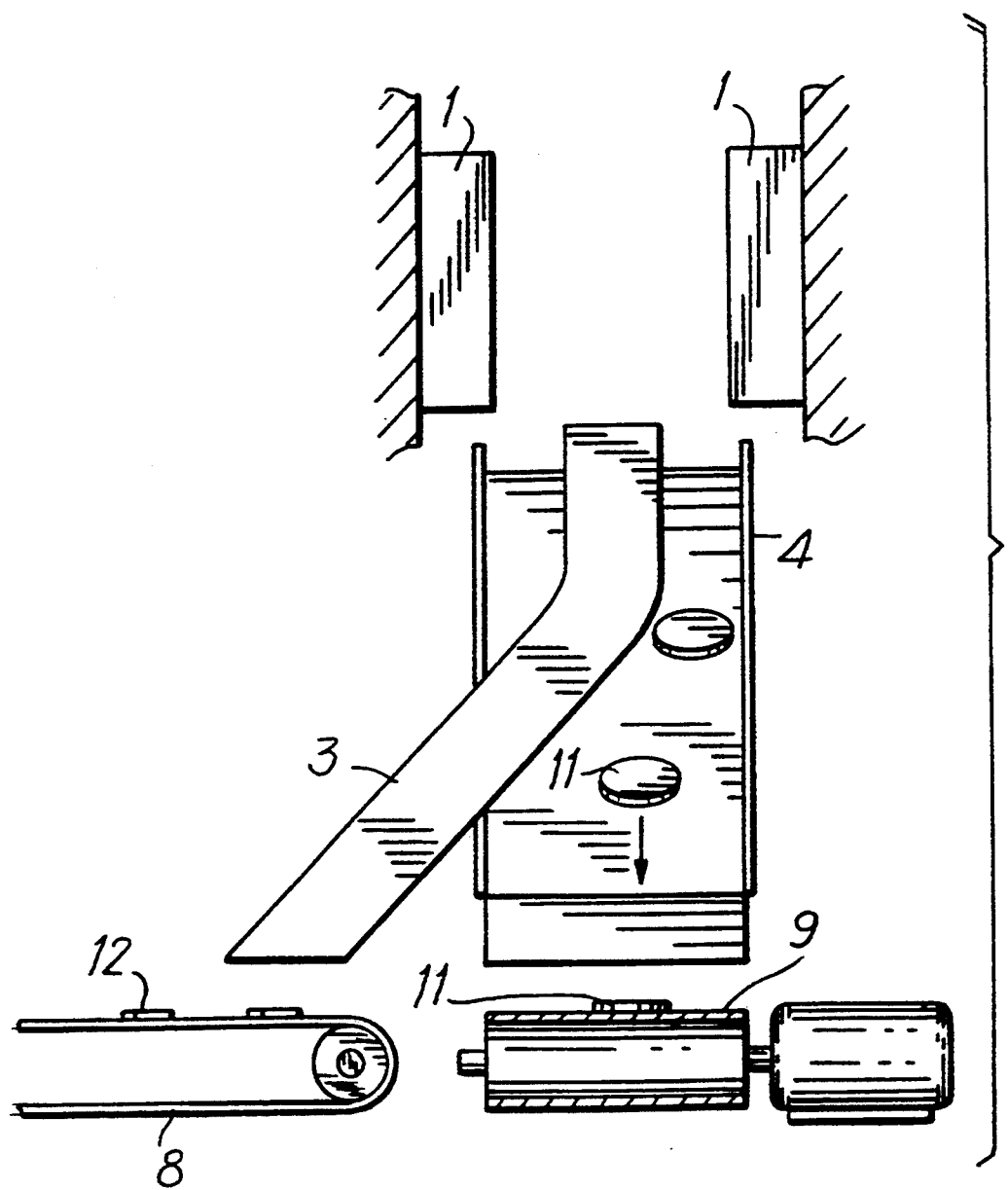
FIG. 3 is a front view of a second embodiment.

FIG. 3 shows in a second embodiment of the invention in which the chute 4 carries the product 11 to a conveyor 9 to allow the product 11 to cool prior to further processing. Additionally, the tube 3 is shown carrying the sprue/runner 12 to a conveyor 8 which can convey the sprue/runner 12 to a location where it can be remelted and reused.

Figure 4:
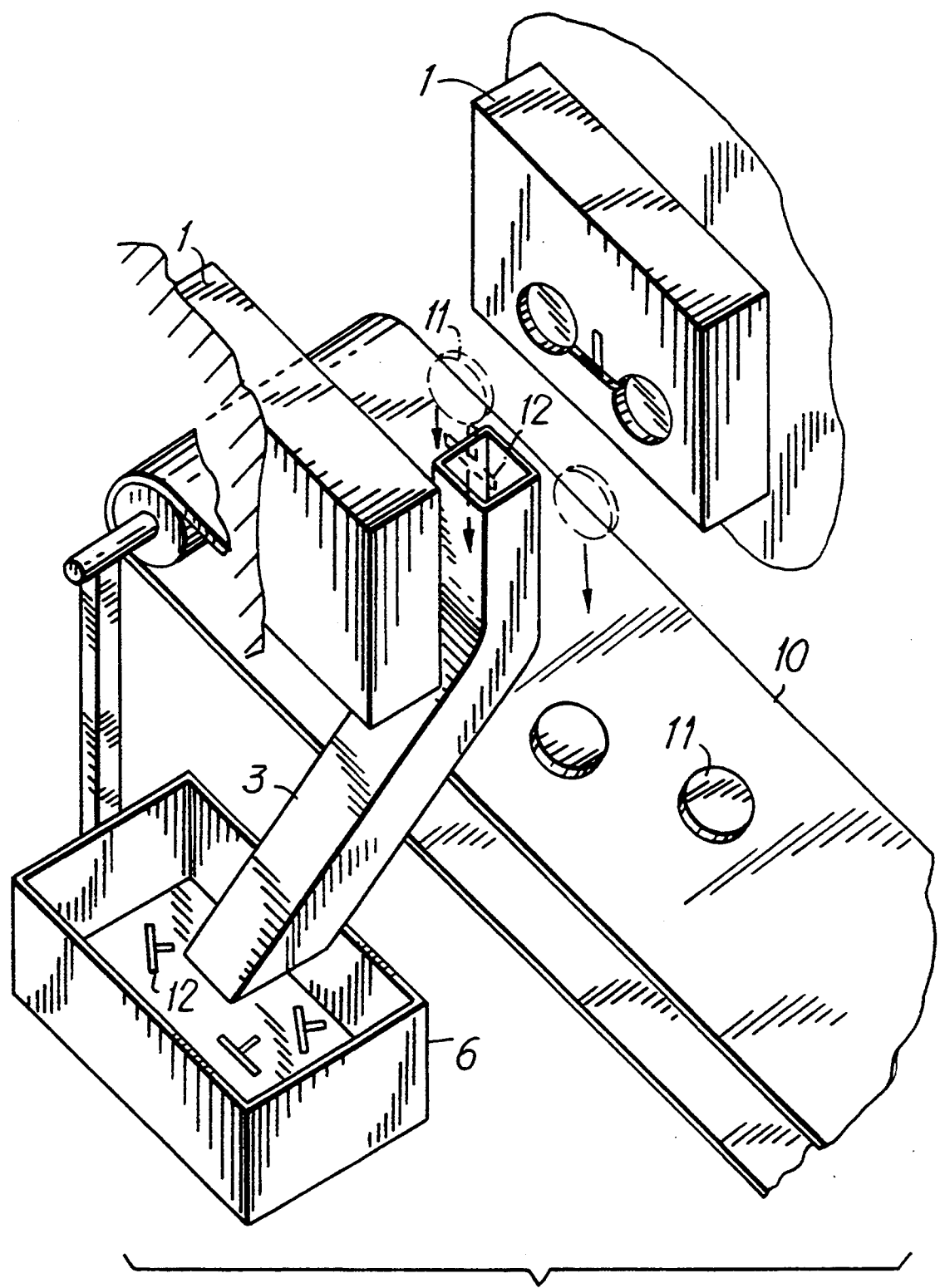
FIG. 4 is a perspective view of a third embodiment.

FIG. 4 shows a third embodiment of the invention in which the chute is replaced with a conveyor 10.

The operation of the invention, using the device of the invention, is described as follows. During the injection molding process, the material to be molded, for example, plastic, is injected into the cavities of the closed molds 1,1 through a sprue or channel. Branching channels off the sprue, called runners, lead to the area of the mold which contains the cavities for the product. When the part of the mold cavity containing the product is filled, the sprue/runner combination is filled with the molding material. Following the injection molding process, the mold is opened and the molded product 11 is separated from the sprue/runner 12 by subgating, which is a conventional process of separating the connections between the runner and the product upon their ejection from the mold. Then, the sprue/runner 12 falls freely into the inlet opening 3a of the tube 3 and the product 11 falls freely onto the chute 4. In this manner, the sprue/runner 12 and the product 11 are separated automatically without requiring manual handling and without requiring a robot. Thus, the arrangement of the tube 3 and the chute 4, makes possible a method for efficiently and inexpensively separating the sprue/runner 12 from the product 11.

In the present invention, it is preferable to employ a tube 3 narrow enough to allow the product 11 to fall to either side of it, while being wide enough to catch the sprue/runner 12. The size of the tube 3, the width of the chute 4, and the location of the tube 3 and the chute 4 with respect to each other and to the bottom of the molds 1,1 may be varied depending on the size of the product 11, the size of the sprue/runner 12 and the distance between the runner and the product 11.

Further, in the second embodiment of the invention shown in FIG. 3, a conveyor 9 may be used to carry the product 11 away from the chute 4 to allow the product to cool prior to further processing. Additionally, a conveyor 8 can be used to deliver the sprue/runner 12 to a desired location where it can be re-melted and used as raw material for a subsequent molding process.

In a third embodiment shown in FIG. 4, the chute 4 is replaced with a conveyor 10. The conveyor 10 receives the product 11 and conveys it away, allowing it to cool off after having been separated from the sprue/runner 12.

In the apparatus of the present invention, in place of the chute 4, it is also possible to place a container or other device for receiving the product 11, under the molds 1,1. Additionally, it is possible to .employ a single device, in the apparatus of the present invention, which has two or more compartments to catch the sprue/runner combination 12 and product 11 as they fall from the open molds 1,1.

Although the illustrated embodiments show molds capable of molding two products with a sprue/runner therebetween such that the single tube 3 is capable of receiving the sprue/runner disposed between the two products, the present invention may be used with molds capable of making more than two products at the same time in which case more than a single tube 3 may be used. For example, if the mold was designed to make three products A, B and C with a sprue and/or runner disposed between each of the three products, then two tubes 2 could be supplied, one tube for the sprue and/or runner between products A and B and another non-illustrated tube 3 for the sprue and/or runner between products B and C. In such a case, both tubes 3 can extend in the same direction as the tube 3 shown in FIG. 1 or, alternatively, the second non-illustrated tube could extend in the opposite direction to the tube 3 shown in FIG. 3, that is, such non-illustrated tube could extend downwardly and to the right in FIG. 1.

Although the tube 3 is shown as having a square or rectangular cross-sectional configuration, the cross-sectional configuration of the tube could be circular or could have any desired cross-sectional configuration. Also as an alternative arrangement, the top side of the tube 3 may be omitted such that the tube 3 could have a generally U-shaped cross-sectional configuration with an open top.

Having described specific embodiments of the invention with reference to the accompanying drawings, it will be appreciated that the present invention is not limited to these precise embodiments and that various changes and modifications can be effected therein by one of ordinary skill in the art without departing from the scope or spirit of the invention as defined by the appended claims.

What I claim is:

1. An apparatus used with injection molding machines for separating an injection molded product from runners formed with the injection molded product in injection molds which are moveable between open and closed positions along a mold axis comprising:

product-receiving means underlying said injection molds for receiving said product after said molds have been opened; said product-receiving means comprising an inclined means having an initial receiving portion underlying said molds and a discharge portion displaced from a mold-underlying position such that the product passes from said initial receiving portion to said discharge portion and are thereby carried in a lateral direction generally perpendicular to said mold axis to said position laterally displaced from said molds;

runner-receiving means underlying said injection molds for receiving said runners after said molds have been opened, said runner-receiving means being operable to carry said runners in a longitudinal direction generally perpendicular to said lateral direction to a position longitudinally displaced from said molds, said runner-receiving means comprising a conduit having an inlet section underlying said molds and a carrying section displaced from a mold-underlying position such that the product passes from said inlet section to said carrying section and are thereby carried to said position longitudinally displaced from said molds, said inlet section of said conduit having a conduit axis which is generally vertically disposed and said carrying section of said conduit has a conduit axis which inclines relative to vertical, said inlet section of said conduit overlying said initial receiving portion of said inclined means;

said product-receiving means and said runner receiving means being positioned relative to said molds and relative to each other such that said product falls into said product-receiving means while being precluded from falling into said runner-receiving means and said runners fall into said runner-receiving means while being precluded from falling on said product-receiving means.

2. An apparatus according to claim 1 wherein said molds are movable between open and closed positions along a mold axis, said product-receiving means being operable to carry said product in a lateral direction generally perpendicular to said mold axis to a position laterally displaced from said molds as said product passes from said initial receiving position to said discharge portion.

3. An apparatus according to claim 2 wherein said runner-receiving means is operable to carry said runners in a longitudinal direction generally perpendicular to said lateral direction to a position longitudinally displaced from said molds.

4. An apparatus according to claim 1 wherein said inclined means comprises an inclined chute.

5. An apparatus according to claim 1 wherein said inclined means comprises an inclined conveyor.

6. An apparatus according to claim 1 wherein said inlet section of said conduit has a conduit axis which is generally vertically disposed and said carrying section of said conduit has a conduit axis which inclines relative to vertical.

7. An apparatus according to claim 6 wherein said inlet section of said conduit has an inlet opening underlying said molds at a position where said runners are ejected from said molds.

8. An apparatus according to claim 3 wherein said molds when opened are spaced from one another a mold opening distance, said product-receiving means comprising an inclined carrier means for carrying said product to said position laterally displaced from said molds, said inclined carrier means having a width measured parallel to said mold axis which is at least as wide as said mold opening distance.

9. A method for separating an injection molded product from runners formed in molds of an injection molding machine comprising the steps of:
- allowing said injection molded product to fall freely from the molds onto an inclined support;
- moving the product on the inclined support in one direction to a position laterally displaced from said molds;
- allowing ejected runners to fall freely from the molds into an inlet opening of a conduit having an inclined section;
- moving said runners along said inclined section of said conduit in another direction relative to said one direction to a position longitudinally displaced from said molds;
- said conduit having a vertically disposed inlet section and further comprising the step of allowing said runners to fall freely in said vertically disposed inlet section before being moved in said other direction along said inclined section;
- disposing said inclined support in a position underlying said vertically disposed inlet section; and
- allowing said runners to fall freely into said vertically disposed inlet section while allowing said product to fall freely outside of said vertically disposed inlet section onto said underlying inclined support.

10. The method according to claim 9 wherein said molds are opened and closed along a mold axis, said one direction being perpendicular to said mold axis, said other direction being parallel to said mold axis.

11. An apparatus used with injection molding machines for separating an injection molded product from runners formed with the injection molded product in injection molds comprising:
- product-receiving means underlying said injection molds for receiving said product after said molds have been opened, said product-receiving means comprising an inclined means having an initial receiving portion underlying said molds and a discharge portion displaced from a mold-underlying position such that the product passes from said initial receiving portion to said discharge portion;
- runner-receiving means underlying said injection molds for receiving said runners after said molds have been opened, said runner-receiving means comprising a conduit having an inlet section underlying said molds and a carrying section displaced from a mold-underlying position such that the product passes from said inlet section to said carrying section;
- said inlet section of said conduit overlying said initial receiving portion of said inclined means and being positioned relative to said molds such that said product falls into said product-receiving means while being precluded from falling into said runner-receiving means and said runners fall into said runner-receiving means while being precluded from falling on said product-receiving means.

* * * * *